United States Patent [19]

Mouton

[11] Patent Number: 5,320,196

[45] Date of Patent: Jun. 14, 1994

[54] PRESSURE SYSTEM FOR DETECTING MALFUNCTIONS OF A FUEL/OIL HEAT EXCHANGER

[75] Inventor: Pierre C. Mouton, Grigny, France

[73] Assignee: Societe Nationale d'Etude et de Construction de Moteurs d'Aviation (S.N.E.C.M.A.), Paris, France

[21] Appl. No.: 59,991

[22] Filed: May 12, 1993

[30] Foreign Application Priority Data

May 13, 1992 [FR] France .................................. 92 05772

[51] Int. Cl.$^5$ ............................................. F16N 29/04
[52] U.S. Cl. ...................................... 165/32; 184/6.11; 184/6.22; 184/104.1; 184/108; 60/39.08
[58] Field of Search ...................... 184/6.11, 6.22, 6.4, 184/104.11, 108; 60/39.08

[56] References Cited

U.S. PATENT DOCUMENTS 4,511,016  4/1985  Doell .................. 184/6.11

FOREIGN PATENT DOCUMENTS 0190059  8/1986  European Pat. Off. .
2514128  4/1983  France .
2526859  11/1983  France .

OTHER PUBLICATIONS

Patent Abstract of Japan, vol. 8, No. 163 (P-290).

*Primary Examiner*—Albert W. Davis, Jr.
*Attorney, Agent, or Firm*—Bacon & Thomas

[57] ABSTRACT

A system is disclosed for detecting a malfunction in a fuel/lubricating oil heat exchanger which includes a pressure differential generator located in the pressure balancing conduit connecting the lubricating oil reservoir with the lubricating enclosure. The pressure differential generator may be a cavitation venturi tube having a throat which, under normal conditions, allows subsonic fluid flow which enables the air in the lubricating enclosure to freely communicate with the interior of the oil reservoir and vice versa. When fuel is mixed with the lubricating oil, due to a malfunction in the fuel/oil heat exchanger, the fuel enters the lubricating oil reservoir causing the fluid level within the reservoir to rise and overflow. The cavitation venturi tube is then supplied with a comparatively hot mixture of fuel and oil having a vapor pressure approximately equal to the reference pressure within the lubricating enclosure. Under these conditions, vaporization takes place at the throat of the venturi tube which effectively blocks any fluid flow through the venturi. As a result, the pressure within the oil reservoir increases.

6 Claims, 3 Drawing Sheets

PRESSURE SYSTEM FOR DETECTING MALFUNCTIONS OF A FUEL/OIL HEAT EXCHANGER

BACKGROUND OF THE INVENTION

The present invention relates to a leak detector for detecting leaks in an oil/fuel heat exchanger in an aircraft turbojet engine lubricating circuit, more particularly such a detector which relies upon an increase of pressure in the oil reservoir caused by fuel mixing with the lubricating oil.

It is conventional practice in aircraft turbojet engines to provide lubricating oil for lubricating various rotating element of the turbojet engine and to cool the lubricating oil by passing it through a fuel/oil heat exchanger which is also connected to the fuel supplied to the engine. The turbojet engine components to be lubricated, such as the turbine bearings, are mounted in an enclosure having a vent hole to establish a reference pressure within the enclosure. A supply pump feeds the lubricating oil from a lubricating oil reservoir through a supply conduit to a spray device located in the enclosure which sprays the oil onto the elements to be lubricated. The lubricating oil circuit may include a return pump which returns the used lubricating oil to the reservoir. Also, an oil filter may be inserted into the return conduit downstream of the return pump. The oil/fuel heat exchanger is typically located between the oil filter and the lubricating oil reservoir.

In order to maintain a slightly excess pressure inside the lubricating oil reservoir, a pressure balancing conduit connects the reservoir to the lubricating enclosure. To compensate for imbalances between the flows of the supply pump and the return pump, the balancing conduit allows air to freely transfer between the oil reservoir and the lubricating enclosure such that the pressure in the reservoir will be substantially equal to the reference pressure in the lubricating enclosure.

Aircraft procedures during aircraft flight require the stopping of the turbojet engine if there is a lubricating circuit malfunction. Means are provided to measure the pressure differential between the outlet pressure of the supply pump and the reference pressure within the lubricating enclosure. When this pressure differential becomes less than a predetermined value, an alarm is transmitted to the aircraft pilot so that he may take the appropriate action.

The pressure of the fuel circulating through the heat exchanger is significantly higher than the outlet pressure of the return pump for the lubricating oil. In case of a malfunction or a leak between the two fluid circuits in the heat exchanger, fuel will be introduced into the lubricating circuit due to its higher pressure. The oil diluted by fuel will seriously degrade the engine components and presents the danger of engine fires, especially when the engine has stopped after the aircraft is on the ground. Under these circumstances, the air/oil labyrinth seals of many engine parts lose their effectiveness, which may allow an oil/fuel mixture to come into contact with high temperature engine components.

SUMMARY OF THE INVENTION

A system is disclosed for detecting a malfunction in a fuel/lubricating oil heat exchanger which includes a pressure differential generator located in the pressure balancing conduit connecting the lubricating oil reservoir with the lubricating enclosure. The pressure differential generator may be a cavitation venturi tube having a throat which, under normal conditions, allows subsonic fluid flow which enables the air in the lubricating enclosure to freely communicate with the interior of the oil reservoir and vice versa.

When fuel is mixed with the lubricating oil, due to a malfunction in the fuel/oil heat exchanger, the fuel enters the lubricating oil reservoir causing the fluid level within the reservoir to rise and overflow. The cavitation venturi tube is then supplied with a comparatively hot mixture of fuel and oil having a vapor pressure approximately equal to the reference pressure within the lubricating enclosure. Under these conditions, vaporization takes place at the throat of the venturi tube which effectively blocks any fluid flow through the venturi. As a result, the pressure within the oil reservoir increases.

A pressure comparator is connected between the oil reservoir and the lubricating oil supply conduit to compare the supply conduit pressure with the pressure within the oil reservoir. When the difference between the supply pressure and the pressure in the oil reservoir falls below a predetermined value due to the increase in pressure within the oil reservoir, an alarm is sounded which indicates a malfunction in the fuel/oil heat exchanger. The decrease in the pressure differential may also be due to a drop in the outlet pressure of the supply pump, in which case the alarm will also sound indicating a lubricating oil circuit malfunction.

BRIEF DESCRIPTION OF THE DRAWINGS

FIG. 4b is a graph showing pressure along the length of the axis L of the venturi tube passageway illustrated in FIG. 4a.

DETAILED DESCRIPTION OF THE PREFERRED EMBODIMENT

Figure 1:
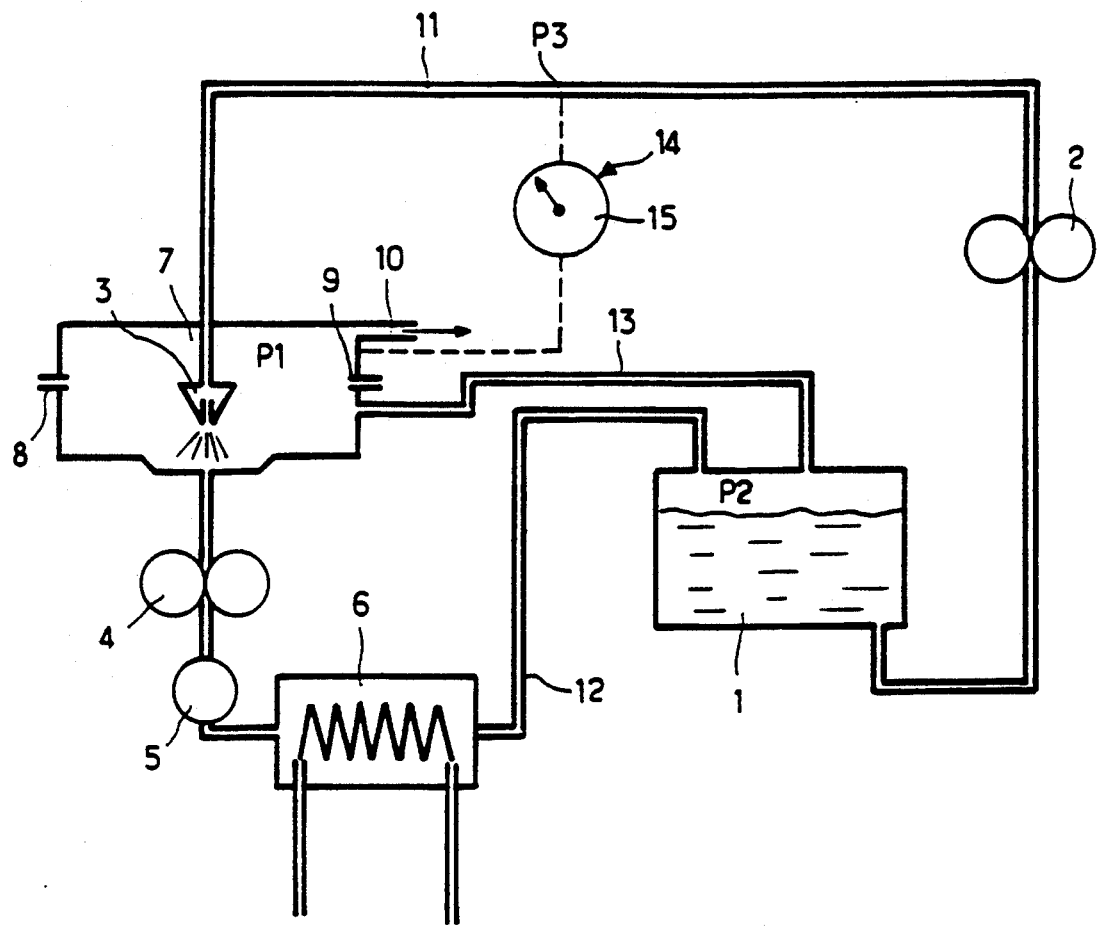
FIG. 1 is a schematic diagram of a conventional lubrication oil circuit associated with a fuel/oil heat exchanger.

FIG. 1 discloses a known oil lubricating circuit including a lubricating oil reservoir 1, a supply pump 2, a lubricant spray nozzle 3, a return pump 4, a filter 5 and an oil/fuel heat exchanger 6. Supply conduit 11 connects the reservoir 1 with the spray nozzle 3, while return conduit 12 enables used lubricating oil to pass from the lubricating enclosure 7 back into the oil reservoir 1. As shown, the spray nozzle 3 is located inside the lubricating enclosure 7 which has labyrinth seals 8 and 9 as well as vent 10 which vents to atmosphere to prevent excess pressure buildup within the lubricating enclosure 7.

Pressure balancing conduit 13 connects the lubricating enclosure 7 with the oil reservoir 1. In normal operating conditions, the pressure P1 within the lubricating enclosure 7 is substantially equal to the pressure P2 within the oil reservoir 1 due to the connection of the pressure balancing conduit 13.

FIG. 1 also illustrates the arrangement of a known monitoring sensor system 14 used in the lubricating circuit. The sensor system 14 includes means to measure the outlet pressure P3 of the supply pump 2, means to measure the reference pressure P1 within the lubricating enclosure 7, means to calculate the differential between P3 and P1, and means to generate an alarm signal when this pressure differential between P3 and P1 falls below a predetermined value. The sensor system 14 may be a pressure differential detector element 15 operatively connected between the outlet of supply pump 2 and the lubricating enclosure 7. A pressure actuated switch (not shown) may be used to activate an alarm when the measured pressure differential is less than the predetermined value.

Figure 2:
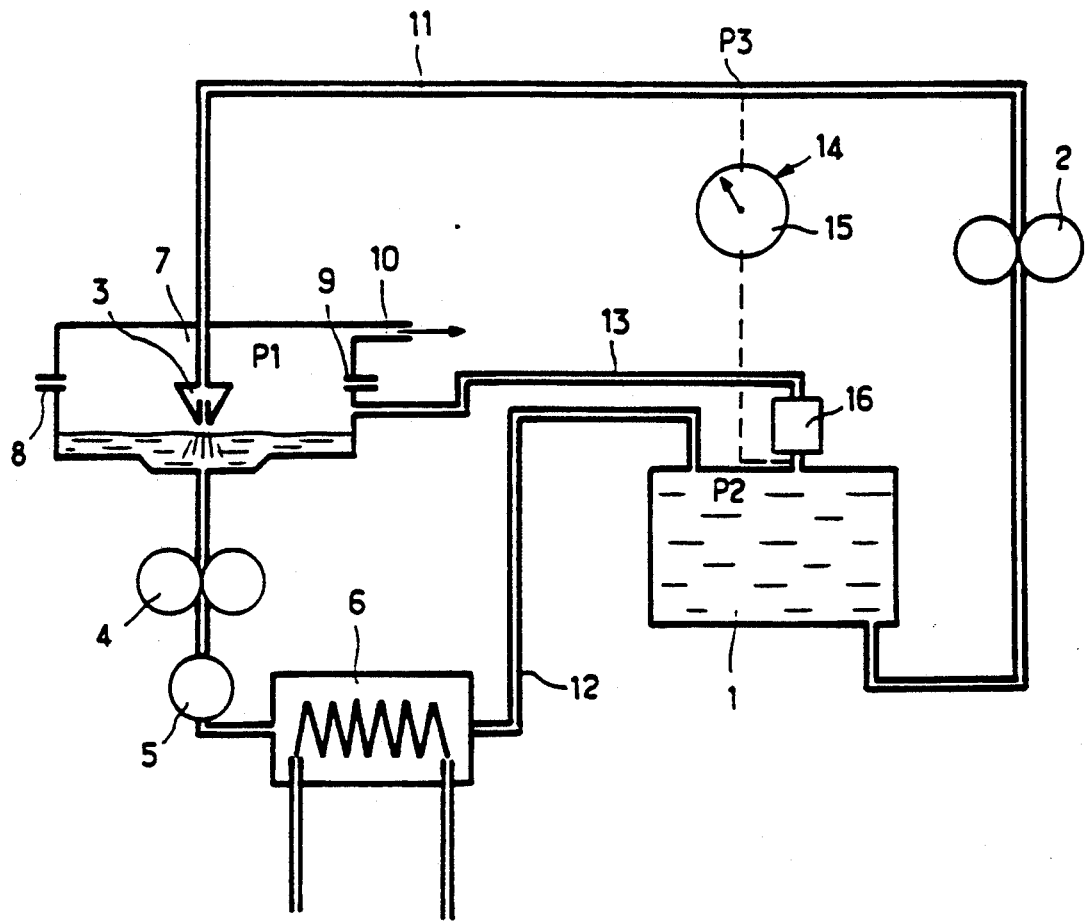
FIG. 2 is a schematic diagram of the oil lubrication circuit including the malfunction detector according to the present invention.
Figure 3:
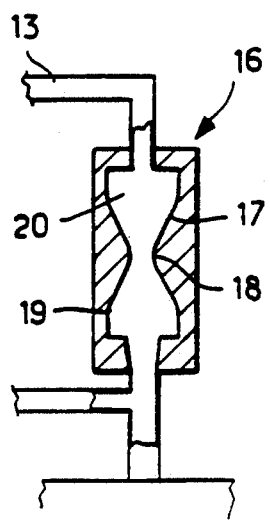
FIG. 3 is a partial, cross-sectional view of the cavitation venturi tube used in the present invention.

FIG. 2 shows the lubricating circuit of FIG. 1 incorporating the detecting system according to the present invention. FIG. 2 also illustrates the conditions of the respective elements when the heat exchanger 6 is malfunctioning so that fuel leaks into the lubricating oil circuit. Such leakage causes the level of fluid within the oil reservoir 1 to rise such that a flow of oil/fuel mixture is introduced into the pressure balancing conduit 13 which, in normal operations, contains only air due to the volume difference between the rates of the supply pump 2 and the return pump 4.

The system according to the present invention utilizes a pressure differential generator 16 operatively associated with the pressure balancing conduit 13 and a differential pressure detector element 15 operatively connected between the outlet of the supply pump 2 and the oil reservoir 1. The pressure differential generator 16 produces an increase in pressure within the reservoir 1 only in the event of a flow through the device of a mixture of oil and fuel. The pressure differential generator 16 may comprise a cavitation venturi tube 17 having a throat portion 18, a constricting portion 19 and a flared portion 20. The cross section of the throat 18 of the venturi tube 17 is designed such that, in normal operation, the air flow normally passing through the pressure balancing conduit 13 will remain at sub-sonic flow and that the pressure P2 within the oil reservoir 1 remains below a predetermined limit. Under such normal operating conditions, when the reservoir 1 has not overflowed, the venturi throat 18 causes negligible pressure differential between P1 and P2 because the kinetic energy in the constricted portion 19 is recovered as pressure in the flared portion 20.

When the fuel leaking from the fuel/oil heat exchanger 6 causes the oil reservoir 1 to overflow, the venturi tube 17 is supplied with a comparatively hot mixture of fuel and oil which, due to the combined action of fuel, temperature, low pressure and aircraft altitude, has a vapor pressure $T_v$ approximately equal to the reference pressure P1. Under these conditions, vaporization of the fuel/oil mixture takes place at the throat 18 of the venturi tube 17, thereby effectively blocking fluid flow through the venturi. As a result, the pressure P2 in the oil reservoir will increase due to the continuing input of the return pump 4 and the fuel leaking into the oil from the malfunctioning heat exchanger 6.

Because of the increase in pressure P2 in the oil reservoir 1, the pressure differential P3−P2, measured by the differential pressure detector element 15 decreases. An alarm signal will be triggered when the pressure differential P3−P2 falls below a predetermined value.

Figure 4A:
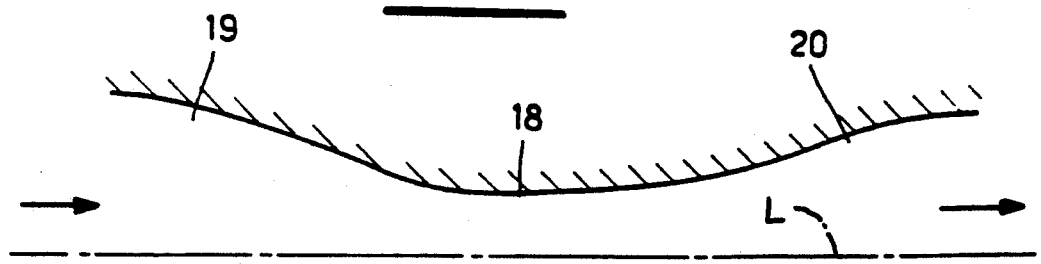
FIG. 4a is a schematic diagram showing a cross-sectional view of the venturi tube passageway.
Figure 4B:
Figure 4B:
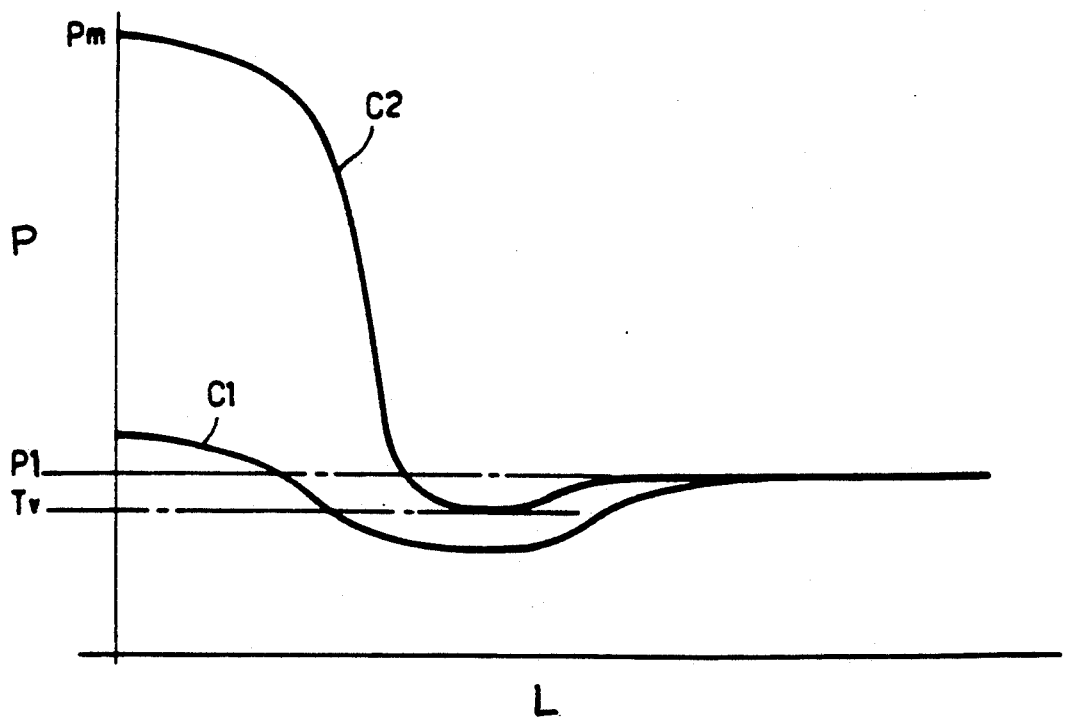

FIGS. 4a and 4b show the profile of the venturi passageway and the curves of pressure versus length along the axis L of the venturi tube 17 for both normal and malfunctioning operating conditions. Curve C1 shows the pressure P under normal operating conditions when only air circulates though the pressure balancing conduit 13 and the venturi tube 17. Curve C2 illustrates the pressure P when the oil reservoir 1 overflows. As can be seen, from curve C2, the pressure P varies between the maximum pressure $P_m$ at the intake of the venturi tube 17 and a minimum value a the throat 18 of the venturi tube 17. The minimum pressure is substantially equal to the vapor pressure $T_v$.

Flight conditions permitting, the alarm indicates to the pilot that the engine should be stopped to enable the engine components to cool before landing the aircraft in order to avoid any possible danger of engine fire which may be caused by elevated engine temperatures and the loss of sealing effectiveness of the labyrinth seals.

The foregoing description is provided for illustrative purposes only and should not be construed as in any way limiting this invention, the scope of which is defined solely by the appended claims.

I claim:

1. A system for detecting a malfunction in a fuel/lubricating oil heat exchanger which will allow fuel to pass into a lubricating oil circuit, comprising:
   a) a lubricating enclosure having lubricating oil spray means located therein and an internal pressure of $P_1$;
   b) a lubricating oil reservoir having an internal pressure of $P_2$;
   c) supply conduit means operatively connecting the oil reservoir and the spray means;
   d) supply pump means operatively associated with the supply conduit means so as to pump lubricating oil from the oil reservoir to the spray means in the lubricating enclosure at a pressure of $P_3$;
   e) return conduit means operatively connecting the lubricating enclosure and the oil reservoir to return lubricating oil from the lubricating enclosure to the oil reservoir;
   f) a fuel/oil heat exchanger operatively associated with one of the supply and return conduit means such that oil passes through the fuel/oil heat exchanger;
   g) pressure balancing conduit means interconnecting the lubricating enclosure and the oil reservoir such that, under normal operating conditions, $P_1$ is generally equal to $P_2$;
   h) pressure differential generating means operatively associated with the pressure balancing conduit means to increase pressure $P_2$ when fuel is mixed with the lubricating oil returning to the oil reservoir thus indicating a malfunction in the fuel/oil heat exchanger; and,
   i) means for measuring the pressure $P_2$.

2. The malfunction detecting system of claim 1 further comprising return pump means operatively associated with the return conduit means to pump lubricating oil from the lubricating enclosure to the oil reservoir.

3. The malfunction detecting system of claim 2 further comprising oil filter means operatively associated with the return conduit means.

4. The malfunction detecting system of claim 1 wherein the pressure differential generating means comprises a cavitation venturi tube.

5. The malfunction defecting system of claim 1 further comprising:
   a) means for measuring the pressure $P_3$;

b) comparison mean operatively associated with the means for measuring pressure $P_2$ and the means for measuring pressure $P_3$ for determining the difference between $P_2$ and $P_3$; and,
c) alarm means operatively associated with the comparison means to generate an alarm signal when the pressure differential between $P_3$ and $P_2$ falls below a predetermined value.

6. The malfunction detecting system of claim 5 wherein the comparison means comprises a differential pressure detector.

* * * * *